United States Patent [19]

LaRou

[11] Patent Number: 4,728,202
[45] Date of Patent: Mar. 1, 1988

[54] SHAFT LOCKING COLLAR FOR BEARING ASSEMBLIES

[75] Inventor: Albert M. LaRou, Naperville, Ill.

[73] Assignee: Emerson Electric Co., St. Louis, Mo.

[21] Appl. No.: 3,378

[22] Filed: Jan. 14, 1987

[51] Int. Cl.⁴ ............................................. F16C 19/06
[52] U.S. Cl. ................................... 384/537; 384/542; 384/585
[58] Field of Search .............. 384/542, 537, 585, 513, 384/294, 903

[56] References Cited

U.S. PATENT DOCUMENTS

| 2,371,400 | 3/1945 | Mantle | 384/294 |
| 2,547,789 | 4/1951 | Skeel | |
| 3,276,828 | 10/1966 | Mansfield | |
| 4,364,615 | 12/1982 | Euler | 384/903 |
| 4,537,519 | 8/1985 | LaRou et al. | 384/478 |

Primary Examiner—Lenard A. Footland
Attorney, Agent, or Firm—Aubrey L. Burgess

[57] ABSTRACT

A two part locking collar for bearing assemblies which is received around axial fingered ends of the bearing's inner race and drawn together by differential screws, each having a part of one thread and a part of a different thread.

4 Claims, 13 Drawing Figures

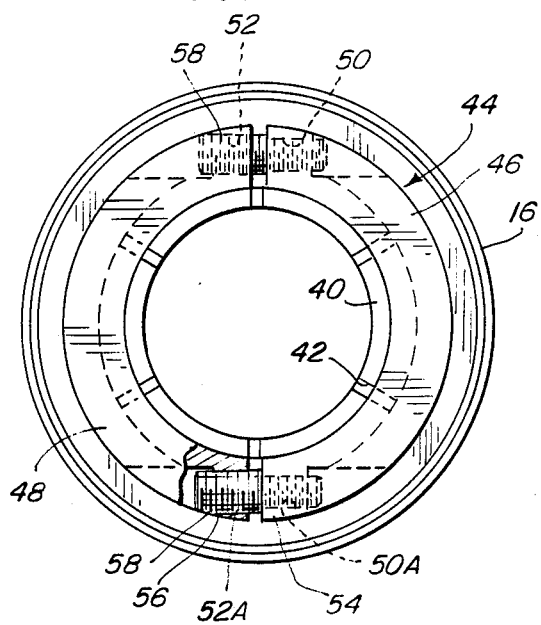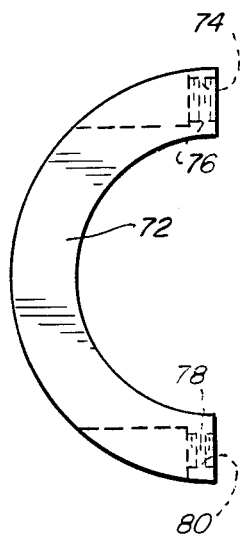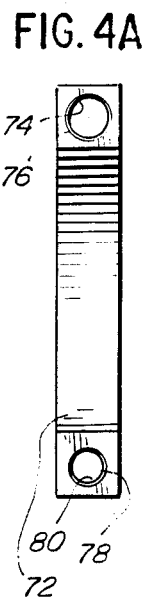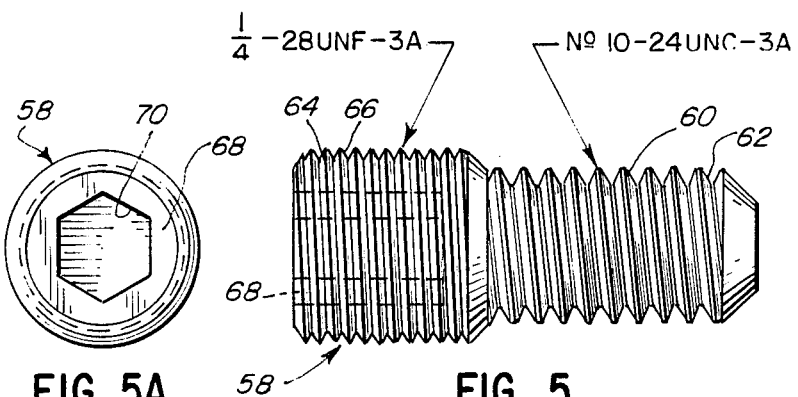

SHAFT LOCKING COLLAR FOR BEARING ASSEMBLIES

FIELD OF THE INVENTION

The present invention relates to a shaft locking collar arrangement for bearing assemblies.

BACKGROUND OF THE INVENTION

Various arrangements are known in the art for securing the inner race of a bearing assembly to a rotatable shaft with as strong a physical locking force being exerted as is reasonably possible to insure secure locking to the shaft and with maximum accommodation for radial and thrust or axial loads or either of them on the shaft. Known arrangements include shaft engaging set screws, plural locking or tightening means on a shaft surrounding collar with multiple shaft engaging set screws, and the patented SKWEZLOC (Registered Trademark), (U.S. Pat. No. 3,276,828) arrangement which includes generally equally spaced inner ring or race finger extensions which, when locked with a single screw locking collar, serves to grip and hold the shaft and the inner race tightly in position allowing near-perfect concentricity of the inner race with the shaft so as to permit the use of the so held bearing with high speed shafts.

DESCRIPTION OF PRIOR ART

Mansfield, U.S. Pat. No. 3,276,828 is described above and reference is made to that description.

LaRou, U.S. Pat. No. 4,537,519 is a shaft locking arrangement which comprises generally the same one screw compressible locking collar as in the aforesaid Mansfield patent; however, the axially extending fingers of the inner ring or race are provided with recessed grooved areas, thus providing even greater holding power than obtainable with the arrangement in the Mansfield patent, supra.

Skeel, U.S. Pat. No. 2,547,789 relates to a wedge clamp mechanism using dual threaded screws. Various arrangements are illustrated and described, but generally a wedging member is moved to a wedging position by action of one set of threads while the other threads are screwed into a support or the like.

SUMMARY OF THE INVENTION

The present invention relates to a locking collar for use with bearing assemblies, the locking collar comprising a pair of semi-annular members, each having a pair or set of threaded openings therethrough, such that when placed together to form an annular collar, the openings of one member are concentric with the openings of the other member. Usually the openings in one member are larger than the openings in the other member. Each opening in one member is provided with threads of one size while each opening in the other member is provided with threads of a different size, such that each pair of concentric openings receives a differential screw, i.e., a screw having a large portion with one thread size and a smaller portion with a different thread size, each portion mating with the threads of the pair of concentric openings.

In another embodiment, each semi-annular member can be identical and thus interchangeable, each with one large and one smaller threaded opening. This modification reduces inventory of parts because only one configuration of collar part is required.

The annular member comprising two halves can be preassembled with the screws and placed over the axially extending fingers at one end of an inner race, the fingers being similar to those illustrated in either the Mansfield or LaRou patents, supra. After being so assembled, the screws are tightened alternately bringing the two halves of the locking collar together into clamping relationship with the axially extending fingers. The use of this arrangement results in high clamping force at lower torque and stress than when using the prior art uniform threaded screw form. For this advantage, there is a modest increase in the cost of the screws.

BRIEF DESCRIPTION OF THE DRAWINGS

FIG. 3 is an end view of the bearing assembly of FIG. 1 showing the locking collar of this invention with parts broken away to show details of the screw arrangement; and FIG. 4 is a plan view of one half of a two part locking collar which comprises a second embodiment of this invention in which the two parts are identical and interchangeable;

FIG. 4A is a view taken on line 4—4 of FIG. 4;

FIGS. 5 and 5A are a views of the screw adaptable for use with the collars illustrated in FIGS. 1, 2, 3 and also 4.

DETAILED DESCRIPTION OF THE PREFERRED EMBODIMENTS

Figure 1:
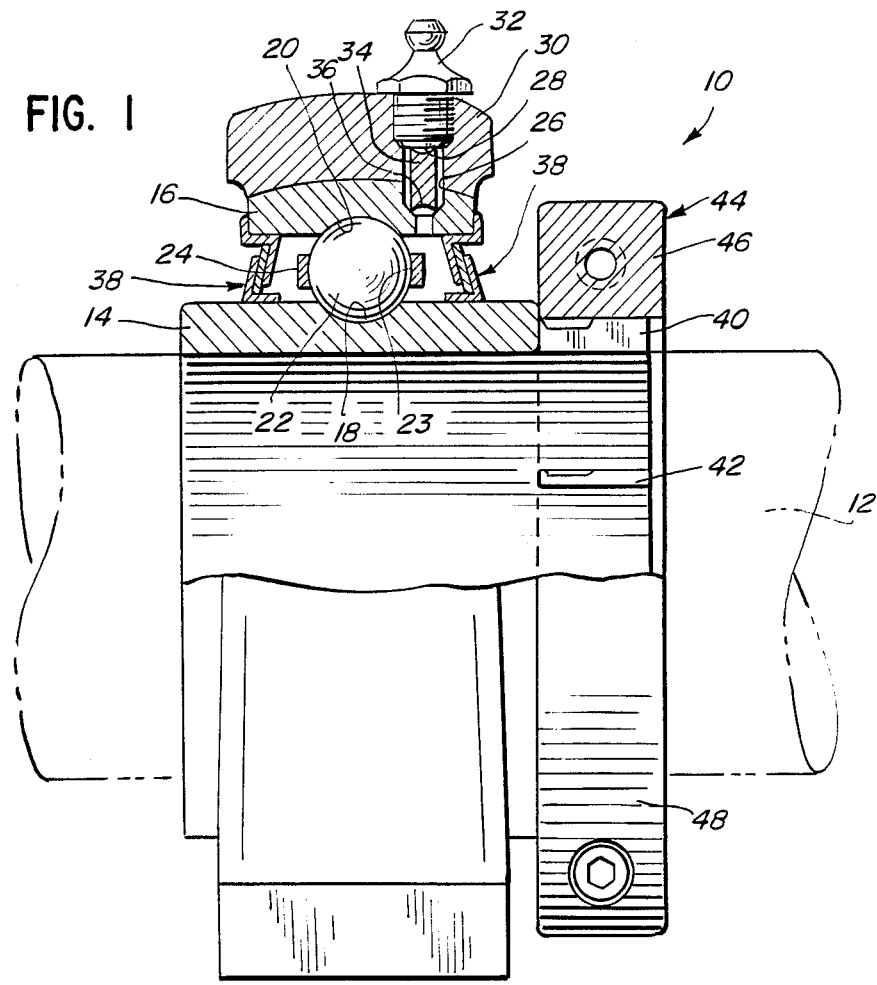
FIG. 1 is a partial sectional view of a bearing assembly in a housing or pillow block including the shaft locking collar of this invention.

Referring to the drawings, and especially to FIG. 1, the bearing assembly 10 is illustrated as being connected to a shaft 12 which passes through the inner race 14 of the assembly 10. The assembly 10 comprises, in addition to the inner race 14, an outer race 16, a wear hardened grooved raceway 18 in the inner race 14, a wear hardened grooved raceway 20 in the outer raceway 16, the raceways being radially opposed to one another, and a plurality of anti-friction rolling elemements, illustrated as balls 22, in the raceways 18 and 20. The balls 22 are mounted in and spaced by pockets 23 of a cage element 24. A lubricating passage 26 is provided in the outer race and is aligned with a passageway 28 in a bearing housing or pillow block 30 in which the bearing assembly 10 is mounted. A grease fitting 32 is received in the passageway 28, and a locking or locating pin 34 in the passage 28 and in a dimple 36 in the outer race serves to limit relative rotation between the bearing assembly 10 and the pillow block 30. Sealing means 38 are provided at each end of the assembly to seal the assembly from ingress of dirt and debris and also to retain lubricant between the races. Sealing arrangements are well known in the art and need no further description.

Figure 2:
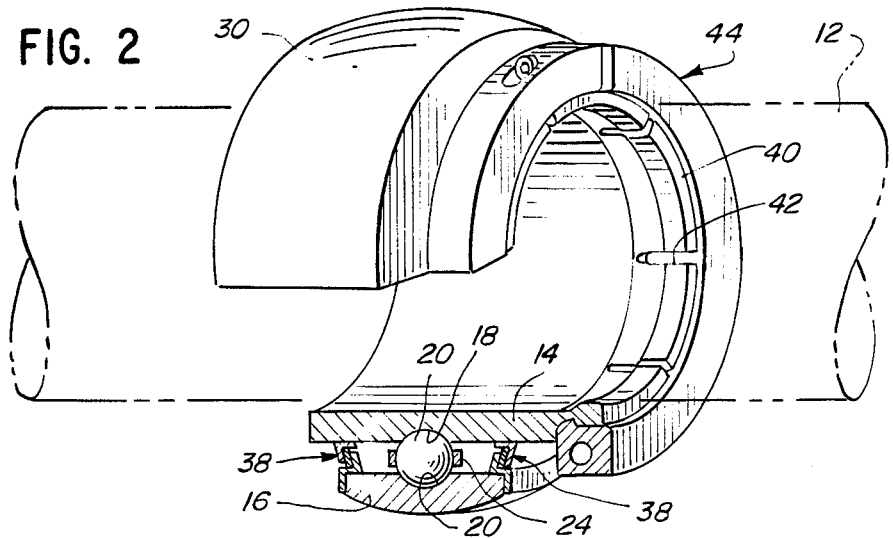
FIG. 2 is an isometric view of a portion of the bearing assembly of FIG. 1 locked to the shaft by the shaft locking collar without the pillow block.

As can be seen in FIGS. 1 and 2, the inner race 14 includes axial finger extensions 40 generally formed by providing slots 42 parallel to the axis of and in the race 14. These finger extensions permit radial compression by a surrounding locking collar 44; however, at times, the extensions 40 extend from both ends of the race 14 and a locking collar is used at both ends of the race. The fingers can be as shown in either the Mansfield or LaRou patents, supra.

The locking collar 44, more particularly illustrated in FIG. 3, is an annular assembly of two generally semi-circular or semi-annular parts or halves 46 and 48. Part 46 has openings 50, 50A of a first diameter and part 48 has openings 52, 52A of a second and different diameter. When the collar parts are assembled for use, the openings 50 and 52 are concentric with one another and the openings 50A and 52A are concentric with one another. The openings 50 and 50A are threaded as at 54 with a first sized thread while the openings 52 and 52A are threaded as at 56 with a different sized thread.

Screws 58 as illustrated in FIG. 5 comprise a first part 60 of a first diameter with a thread size 62 adaptable to mesh with threads 54 and a second part 64 of a second diameter with a thread size 66 adapted to mesh with threads 56. The head 68 of the screw 58 is provided with a recess 70 to receive a hexagonal wrench and the like. The head 68 can be slotted to receive the blade of an ordinary screwdriver or formed to receive the blade of a Phillips screwdriver without departing from the spirit of the invention.

Figure 6:
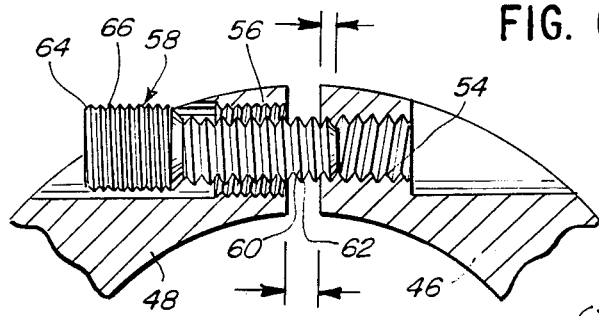
FIGS. 6 to 11 show the relationship of the locking collar parts or halves during the tightening process.
Figure 7:
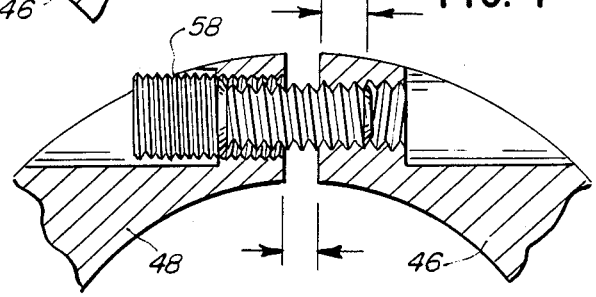
Figure 8:
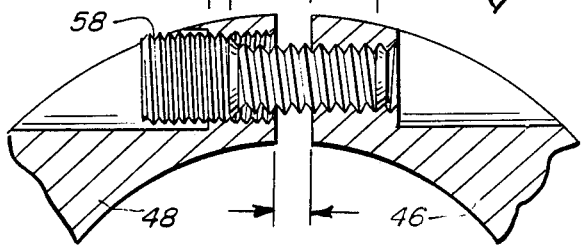

The two part collar of this invention permits preassembly of the screws and collar halves with thread engagement drawing the two halves together until the ID just slips over the fingered end of the inner race of the bearing, as shown and described by the legends in FIGS. 6, 7 and 8.

Figure 9:
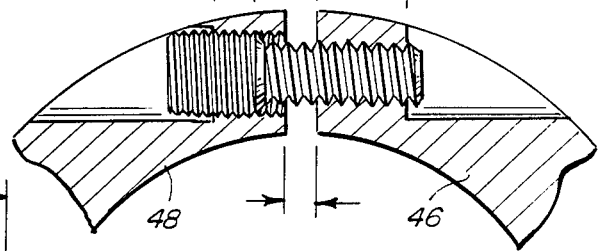
Figure 10:
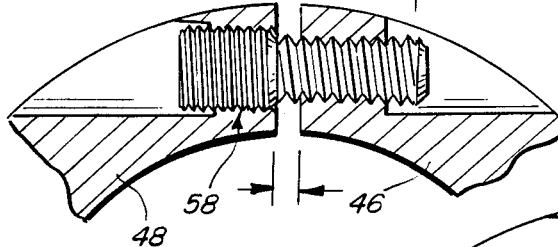
Figure 11:
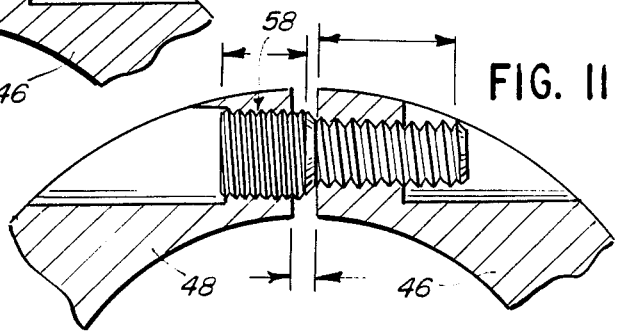

At installation, alternate tightening of the screws draws the two halves of the collar together by virtue of the difference in thread advance at each end of the screws, see FIGS. 9, 10 and 11. The collar construction results in higher clamping force at lower screw torque and stress when compared to a split collar using one or more clamping screws with threads of one size only.

This differential lead on the screw permits a larger root diameter of the smaller end while eliminating the need for a suitable collar cross section support for a standard screw head. Thus the larger diameter of the differential screw replaces the normal screw head without projecting beyond the collar outer diameter.

The locking collar, one half of which is illustrated in FIGS. 4 and 4A comprises an annular assembly of two interchangeable and like semi-annular halves or parts 72, each having an opening 74 of one diameter threaded at 76, and an opening 78 of a different diameter threaded at 80. The threads of 76 and 80 are of different size. The two parts are assembled and connected by screws 58 in the same manner as the locking collar 44, except that tightening of the screws is accomplished from opposite sides of the collar instead of from the same side.

The appended claims are intended to cover all reasonable equivalents and be given the broadest interpretation as permitted by the prior art.

I claim:

1. A bearing assembly comprising:
   an inner and an outer race, each race having a raceway;
   anti-friction means between said races and contacting said raceways;
   said inner race being cylindrical, having a slotted extension which form fingers, and being adapted to receive a shaft to be connected thereto;
   means connecting said inner race to said shaft comprising a two part collar encircling said inner race slotted extension;
   said collar parts each having a pair of threaded openings with each opening in one part being concentric with a corresponding opening in the other part; and
   a pair of differential screws, one screw being received in each pair of concentric openings, each screw having a body with one portion of one thread size and a portion with a different thread size, whereby tightening said screws draws said collar parts together to compress said fingers toward said shaft to lock said bearing thereto.

2. A bearing assembly as recited in claim 1, in which the body of each screw has a portion of one diameter and a portion of a different diameter.

3. A bearing assembly as recited in claim 1, in which each semi-annular member is identical and interchangeable.

4. A bearing assembly as recited in claim 1, in which one semi-annular member is provided with openings threaded to receive said screw portion of one thread size and the other semi-annular member is provided with openings to receive said screw portion of said different thread size.

* * * * *